US006850305B2

(12) United States Patent
Hsieh et al.

(10) Patent No.: US 6,850,305 B2
(45) Date of Patent: Feb. 1, 2005

(54) LAYOUT STRUCTURE FOR A LIQUID CRYSTAL DISPLAY

(75) Inventors: Wen-Han Hsieh, Kaohsiung (TW); Yen-Chen Chen, Hsinchu (TW)

(73) Assignee: Himax Technologies, Inc. (TW)

( * ) Notice: Subject to any disclaimer, the term of this patent is extended or adjusted under 35 U.S.C. 154(b) by 0 days.

(21) Appl. No.: 10/656,259

(22) Filed: Sep. 8, 2003

(65) Prior Publication Data

US 2004/0051835 A1 Mar. 18, 2004

(30) Foreign Application Priority Data

Sep. 13, 2002 (TW) ....................................... 91121082 A

(51) Int. Cl.[7] ............................................. G02F 1/1343

(52) U.S. Cl. ...................................................... 349/144

(58) Field of Search ................................ 349/143–146, 349/106

(56) References Cited

U.S. PATENT DOCUMENTS 5,457,552 A * 10/1995 Ogurtsov et al. ............. 349/54

* cited by examiner

*Primary Examiner*—Dung T. Nguyen
*Assistant Examiner*—Richard H Kim
(74) *Attorney, Agent, or Firm*—Rabin & Berdo, P.C.

(57) ABSTRACT

In this invention a layout structure for a liquid crystal display, which includes a first data line, a second data line, a first scan line, a second scan line, a third scan line, and a first and second pixel. The first pixel includes a first sub-pixel, a second sub-pixel, and a third sub-pixel. The first sub-pixel is coupled to the first data line and first scan line. The second sub-pixel is coupled to the second data line and first scan line. The third sub-pixel is coupled to the second data line and second scan line. The second pixel includes a fourth sub-pixel, a fifth sub-pixel, and a sixth sub-pixel. The fourth sub-pixel is coupled to the first data line and second scan line. The fifth sub-pixel is coupled to the first data line and third scan line. The sixth sub-pixel is coupled to the second data line and third scan line.

4 Claims, 3 Drawing Sheets

T
S1
S2
G1
G2
G3
p11
p21
p31
p12
p22
p32

LAYOUT STRUCTURE FOR A LIQUID CRYSTAL DISPLAY

This application claims benefits of Taiwan application Serial No. 91121082, filed Sep. 13, 2002.

BACKGROUND OF THE INVENTION

1. Field of the Invention

The invention relates to a layout structure for a liquid crystal display, and more particularly to a layout structure for a liquid crystal display capable of having fewer data lines.

2. Description of the Related Art

Recently, small-sized TFT (Thin Film Transistor) LCD (Liquid Crystal Display) modules have been widely used in small hand-held electronic devices, such as PDAs (Personal Digital Assistants), and mobile phones. FIG. 1 is a schematic illustration showing a conventional TFT-LCD module, where the TFT-LCD module includes sub-pixels p arranged in an m×n array, a source driver unit, and a gate driver unit. The source driver unit provides n data channels connected to data lines S1 to Sm respectively. The gate driver unit provides m scan channels connected to the scan lines G1 to Gn respectively. Every three sub-pixels p constitutes a pixel, and represents the colors red, green and blue respectively. Each sub-pixel p is coupled to a corresponding data line through a transistor T. The gate of the transistor T is coupled to a corresponding scan line. A typical source driver IC has 384 channels and may provide the channels required for 128 pixels, and a typical small-sized TFT-LCD only needs one source driver IC.

Requirements for frame quality and frame resolution are steadily increasing, the number of channels of the driver IC used in this application must be increase as well. The number of source driver channels must be increased because for each pixel there are three channels for red, green, and blue sub-pixels that have to be added. A TFT-LCD with a resolution of 176×220 may require 528 (176×3) channels in the source driver IC. Therefore, a source driver IC having 384 channels provides an insufficient number of channels, as required by the LCD. The chip size of the driver IC of the source driver unit is mainly limited by pin number (pad-limited), while the chip size of the driver IC of the gate driver unit is mainly limited by the internal circuit size (core-limited). Increasing the channel number may invariably increase the pin number of the driver IC of the source driver unit, thereby greatly influencing chip size.

There are several methods of using a TFT-LCD with high resolution.

1. It is possible to use two general source driver ICs each having 384 channels. However, the cost of the driver ICs is increased. In addition, because the small-sized TFT-LCD module is mainly used in small devices, the size of the mechanism has to be increased if two ICs are needed, which doesn't meet the requirement of having a small device size. Furthermore, it is possible that only a small portion of the channels of the second source driver IC are used. In this example, only 144 (528–384) channels of the second IC are used, which is not economically efficient.

2. It is possible to provide all the channels required by a driver IC. However, this may increase packaging difficulties, and the number of channels increased is also limited. Additionally, verifying the redesigned IC is a time consuming process.

3. It is possible to enlarge the size of the driver IC in order to increase the number of channels. However, the cost and mechanism volume may be increased, which may not meet size requirements for small devices. Additionally, verifying the redesigned IC is a time consuming process.

SUMMARY OF THE INVENTION

It is therefore an object of the invention to provide a layout structure for a liquid crystal display so as to decrease the number of required channels in the source driver IC while providing the desired high resolution.

The invention achieves the above-identified object by providing a layout structure for a liquid crystal display, which includes a plurality of units. Each unit includes a first data line, a second data line, a first scan line, a second scan line, a third scan line, a first pixel, and a second pixel. The first data line and second data line are arranged substantially in parallel with each other. The first, second, and third scan lines are arranged substantially in parallel, and arranged in a matrix pattern together with the first and second data lines. The first pixel includes a first sub-pixel, a second sub-pixel, and a third sub-pixel. The first sub-pixel is coupled to the first data line and first scan line. The second sub-pixel is coupled to the second data line and first scan line. The third sub-pixel is coupled to the second data line and second scan line. The second pixel includes a fourth sub-pixel, a fifth sub-pixel, and a sixth sub-pixel. The fourth sub-pixel is coupled to the first data line and second scan line. The fifth sub-pixel is coupled to the first data line and third scan line. The sixth sub-pixel is coupled to the second data line and third scan line.

When the first scan line is enabled, data on the first data line is input to the first sub-pixel, and data on the second data line is input to the second sub-pixel. When the second scan line is enabled, data on the second data line is input to the third sub-pixel, and data on the first data line is input to the fourth sub-pixel. When the third scan line is enabled, data on the first data line is input to the fifth sub-pixel, and data on the second data line is input to the sixth sub-pixel.

The invention also achieves the above-identified object by providing another layout structure for a liquid crystal display, which includes a plurality of units. Each unit includes a first, second, third, and fourth data line; a first, second, and third scan line; and a first, second, third, and fourth pixel. The first, second, third, and fourth data lines are arranged almost completely in parallel. The first, second, and third scan lines are arranged almost completely in parallel, and arranged in a matrix pattern together with the first, second, third, and fourth data lines. The first pixel includes first, second, and third sub-pixels. The first sub-pixel is coupled to the first data line and first scan line. The second sub-pixel is coupled to the second data line and first scan line. The third sub-pixel is coupled to the second data line and second scan line. The second pixel includes fourth, fifth, and sixth sub-pixels. The fourth sub-pixel is coupled to the first data line and second scan line. The fifth sub-pixel is coupled to the first data line and third scan line. The sixth sub-pixel is coupled to the second data line and third scan line. The third pixel includes seventh, eighth, and ninth sub-pixels. The seventh sub-pixel is coupled to the third data line and second scan line. The eighth sub-pixel is coupled to the third data line and first scan line. The ninth sub-pixel is coupled to the fourth data line and first scan line. The fourth pixel includes tenth, eleventh, and twelfth sub-pixels. The tenth sub-pixel is coupled to the third data line and third scan line. The eleventh sub-pixel is coupled to the fourth data line and third scan line. The twelfth sub-pixel is coupled to the fourth data line and second scan line.

When the first scan line is enabled, data on the first data line is input to the first sub-pixel, data on the second data line is input to the second sub-pixel, data on the third data line is input to the eighth sub-pixel, and data on the fourth data line is input to the ninth sub-pixel. When the second scan line is enabled, data on the second data line is input to the third sub-pixel, data on the first data line is input to the fourth sub-pixel, data on the third data line is input to the seventh sub-pixel, and data on the fourth data line is input to the twelfth sub-pixel. When the third scan line is enabled, data on the first data line is input to the fifth sub-pixel, data on the second data line is input to the sixth sub-pixel, data on the third data line is input to the tenth sub-pixel, and data on the fourth data line is input to the eleventh sub-pixel.

Other objects, features, and advantages of the invention will become apparent from the following detailed description of the preferred but non-limiting embodiments. The following description is made with reference to the accompanying drawings.

DETAILED DESCRIPTION OF THE INVENTION

In a TFT-LCD module with a resolution of 176×220, each pixel includes three sub-pixels, the source driver IC has to provide 528 (176×3) output channels, and the gate driver IC has to provide 220 output channels. Buta general source driver IC has only 384 channels. Hence, an object of the invention is to reduce the number of channels required while maintaining the desired high resolution.

Figure 1:
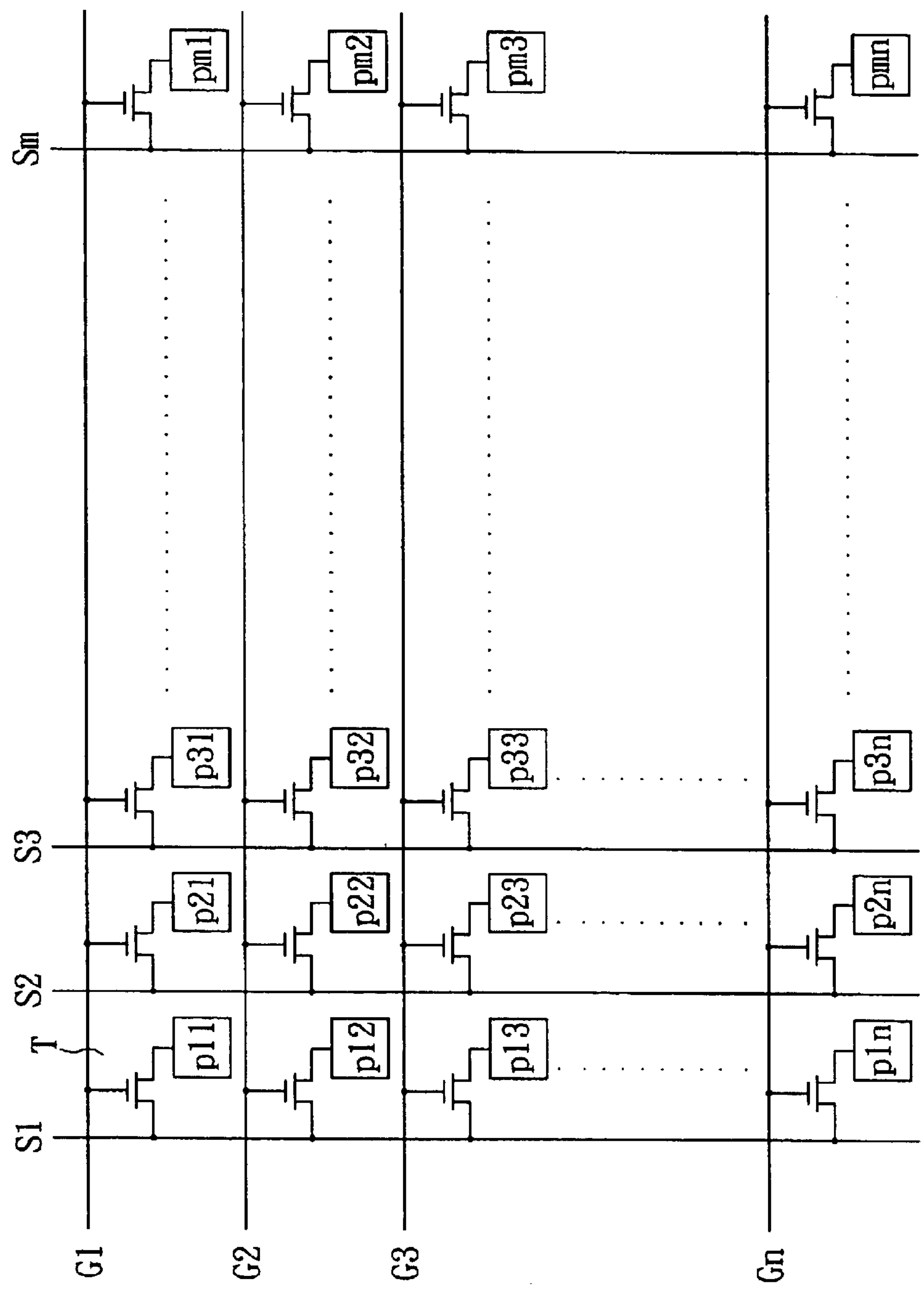
FIG. 1 (Prior Art) is a schematic illustration showing the layout structure of a conventional LCD.
Figure 2:
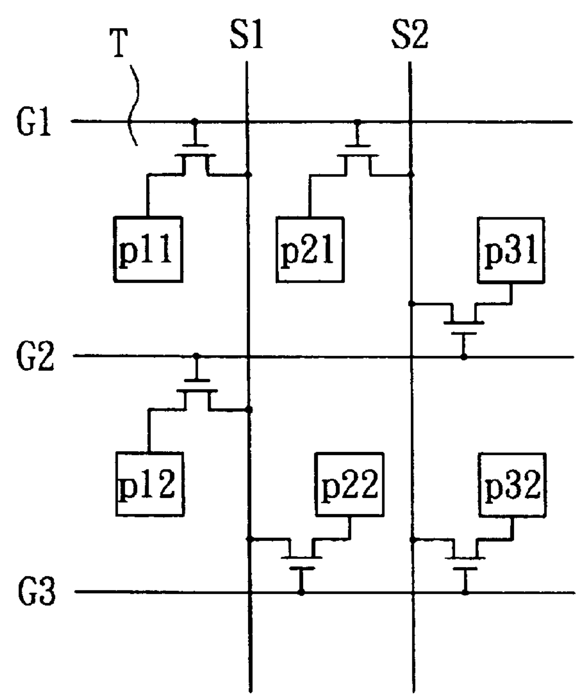
FIG. 2 is a schematic illustration showing a unit with the TFT-LCD layout structure according to a first embodiment of the invention.

The invention is to amend the layout of the TFT-LCD and the flow for displaying data so as to achieve the object of the invention. The layout structure of the TFT-LCD includes multiple units arranged in a repeating matrix pattern. FIG. 2 is a schematic illustration showing a unit with a TFT-LCD layout structure according to the first embodiment of the invention. The TFT-LCD includes a plurality of the above-mentioned units arranged in a matrix pattern. The unit includes data lines S1 and S2 arranged substantially in parallel, and scan lines G1, G2 and G3 arranged substantially in parallel. Data lines S and scan lines G are perpendicular to each other. The unit includes a first pixel P1 and a second pixel P2, each of which includes three sub-pixels corresponding to the colors red, green, and blue. The first pixel includes sub-pixels p11, p21, and p31. Sub-pixel p11 of the first pixel is coupled to the data line S1 and scan line G1; sub-pixel p21 is coupled to the data line S2 and scan line G1; and sub-pixel p31 is coupled to the data line S2 and scan line G2. The second pixel includes sub-pixels p12, p22, and p32. Sub-pixel p12 is coupled to the data line S1 and scan line G2; sub-pixel p22 is coupled to the data line S1 and scan line G3; and sub-pixel p32 is coupled to the data line S2 and scan line G3. Each sub-pixel is coupled to the corresponding data line and scan line through a transistor T.

When scan line G1 is enabled, data on data line S1 is input to the sub-pixel p11 and data on data line S2 is input to sub-pixel p21. When scan line G2 is enabled, data on data line S2 is input to sub-pixel p31 and data on data line S1 is input to sub-pixel p12. When scan line G3 is enabled, data on data line S1 is input to sub-pixel p22 and data on data line S2 is input to sub-pixel p32.

Two conventional pixels similar to those in the embodiment may need three data lines and two scan lines. In this embodiment, the number of data lines is reduced to two and the number of scan lines is increased to three. Hence, the number of scan lines may be effectively decreased so that the number of channels required by the source driver IC is reduced. An LCD employing this invention would have 528×220 sub-pixels, 352 (528×2/3) data lines, and 330 (220×3/2) scan lines. Therefore, it is possible to drive the high resolution TFT-LCD by using only one general source driver IC having 384 channels. The total number of channels of the conventional source driver IC and gate driver IC is equal to 748 (528+220). The total number of channels in this embodiment is equal to 682 (352+330), which is 66 (748–682) less than the conventional channel number.

Figure 3:
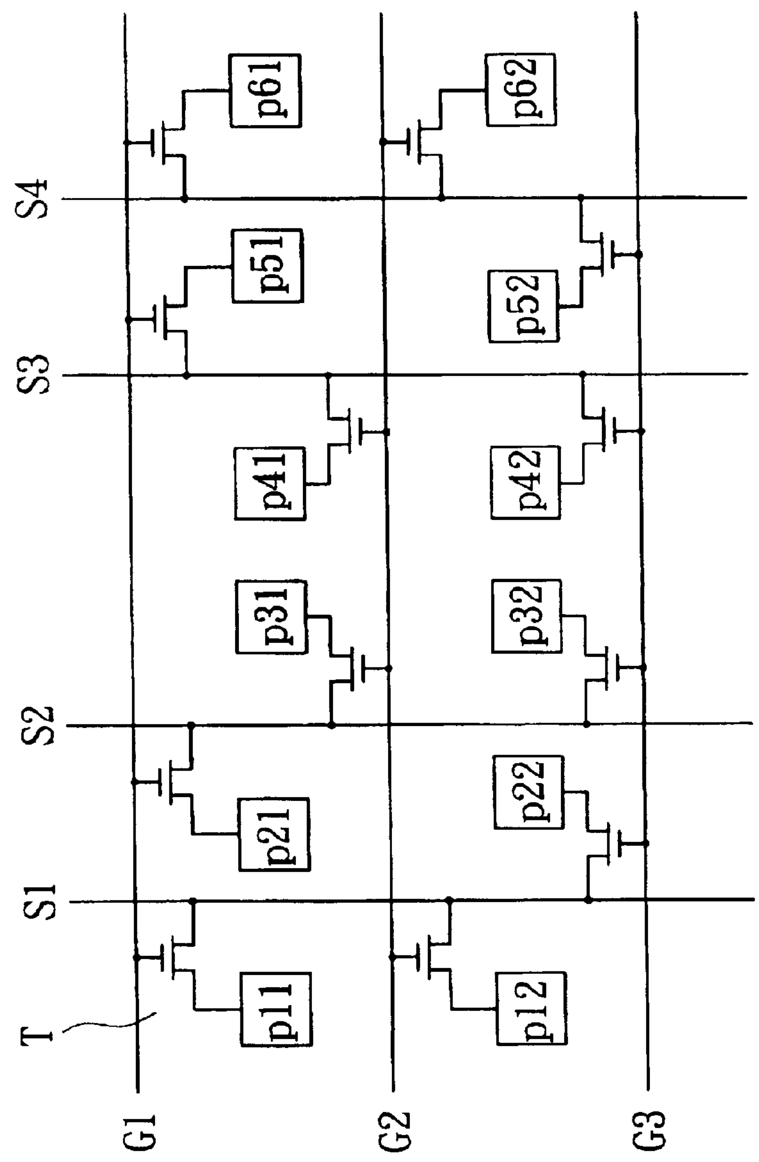
FIG. 3 is a schematic illustration showing a unit with the TFT-LCD layout structure according to a second embodiment of the invention.

FIG. 3 is a schematic illustration showing a unit with a TFT-LCD layout structure according to the second embodiment of the invention. The TFT-LCD includes a plurality of the above-mentioned units arranged in a matrix pattern. The unit includes first, second, third, and fourth pixels. The first pixel includes sub-pixels p11, p21, and p31; the second pixel includes sub-pixels p12, p22, and p32; the third pixel includes sub-pixels p41, p51, and p61; and the fourth pixel includes sub-pixels p42, p52, and p62. The layouts of the first and second pixels are the same as those of the first embodiment, and the layouts of the third and fourth pixels are mirror images of the first and second pixel respectively. Each sub-pixel is coupled to the corresponding data line through a transistor T.

When scan line G1 is enabled, data on data line S1 is input to the sub-pixel p11; data on data line S2 is input to sub-pixel p21; data on data line S3 is input to sub-pixel p51; and data on data line S4 is input to sub-pixel p61. When scan line G2 is enabled, data on data line S2 is input to sub-pixel p31; data on data line S1 is input to sub-pixel p12; data on data line S3 is input to sub-pixel p41; and data on data line S4 is input to sub-pixel p62. When scan line G3 is enabled, data on data line S1 is input to sub-pixel p22; data on data line S2 is input to sub-pixel p32; data on data line S3 is input to sub-pixel p42; and data on data line S4 is input to sub-pixel p52.

The reduced number of channels in the second embodiment is equal to that in the first embodiment. Taking the LCD having 528×220 sub-pixels as an example, it requires 352 data lines and 330 scan lines when employing the layout of this embodiment. Therefore, it is possible to drive the high resolution TFT-LCD using only one general source driver IC having 384 channels. The total number of channels of the conventional source driver IC and gate driver IC is equal to 748 (528+220). In this embodiment, however, the total number of channels is equal to 682 (352+330), which is 66 (748–682) less than the conventional number.

The TFT-LCD layout structures disclosed in the above-mentioned embodiments of the invention may utilize fewer channels without influencing normal functions thereof.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A layout structure for a liquid crystal display that includes a plurality of units, each of the units comprising:

a first data line and a second data line, which are arranged substantially in parallel and adjacent one another;

a first scan line, a second scan line adjacent the first scan line, and a third scan line adjacent the second scan line, the first, second, and third scan lines being arranged substantially in parallel and arranged in a matrix pattern together with the first data line and the second data line;

a first pixel that includes:

a first sub-pixel coupled to the first data line and the first scan line, a second sub-pixel adjacent the first sub-pixel and coupled to the second data line and the first scan line, and a third sub-pixel adjacent the second sub-nixel and coupled to the second data line and the second scan line; and a second pixel that includes;

a fourth sub-pixel coupled to the first data line and the second scan line, a fifth sub-pixel adjacent the fourth sub-pixel and coupled to the first data line and the third scan line, and a sixth sub-pixel adjacent the fifth sub-pixel and coupled to the second data line and the third scan line, wherein, when the first scan line is enabled, data on the first data line is input to the first sub-pixel and data on the second data line is input to the second sub-pixel, wherein, when the second scan line is enabled, data on the second data line is input to the third sub-pixel and data on the first data line is input to the fourth sub-pixel, and wherein, when the third scan line is enabled, data on the first data line is input to the fifth sub-pixel and data on the second data line is input to the sixth sub-pixel.

2. The layout structure according to claim 1, wherein the liquid crystal display is formed by repeatedly arranging the units in a matrix pattern.

3. A layout structure for a liquid crystal display that includes a plurality of units, each of the units comprising:

a first data line, a second data line adjacent the first data line a third data line adjacent the second data line, and a fourth data line adjacent the third data line, all of which are arranged substantially in parallel with each other;

a first scan line, a second scan line adjacent the first scan line, and a third scan line adjacent the second scan line, all of which arranged substantially in parallel with each other and arranged in a matrix pattern together with the first data line, the second data line, the third data line, and the fourth data line;

a first pixel that includes:

a first sub-pixel coupled to the first data line and the first scan line, a second sub-pixel adjacent the first sub-pixel and coupled to the second data line and the first scan line, and a third sub-pixel adjacent the second sub-pixel and coupled to the second data line and the second scan line;

a second pixel that includes:

a fourth sub-pixel coupled to the first data line and the second scan line, a fifth sub-pixel adjacent the fourth sub-pixel and coupled to the first data line and the third scan line, and a sixth sub-pixel adjacent the fifth sub-pixel and coupled to the second data line and the third scan line;

a third pixel that includes:

a seventh sub-pixel coupled to the third data line and the second scan line, an eighth sub-pixel adjacent the seventh sub-pixel and coupled to the third data line and the first scan line, and a ninth sub-pixel adjacent the eighth sub-pixel and coupled to the fourth data line and the first scan line; and a fourth pixel that includes:

a tenth sub-pixel coupled to the third data line and the third scan line, an eleventh sub-pixel adjacent the tenth sub-pixel and coupled to the fourth data line and the third scan line, and a twelfth sub-pixel adjacent the eleventh sub-pixel and coupled to the fourth data line and the second scan line, wherein, when the first scan line is enabled, data on the first data line is input to the first sub-pixel, data on the second data line is input to the second sub-pixel, data on the third data line is input to the eighth sub-pixel, and data on the fourth data line is input to the ninth sub-pixel, wherein, when the second scan line is enabled, data on the second data line is input to the third sub-pixel, data on the first data line is input to the fourth sub-pixel, data on the third data line is input to the seventh sub-pixel, and data on the fourth data line is input to the twelfth sub-pixel, and wherein, when the third scan line is enabled, data on the first data line is input to the fifth sub-pixel, data on the second data line is input to the sixth sub-pixel, data on the third data line is input to the tenth sub-pixel, and data on the fourth data line is input to the eleventh sub-pixel.

4. The layout structure according to claim 3, wherein the liquid crystal display is formed by repeatedly arranging the units in a matrix pattern.

* * * * *